US005113561A

United States Patent [19]

Scott

[11] Patent Number: 5,113,561

[45] Date of Patent: May 19, 1992

[54] STARTER SPRING REWINDER

[76] Inventor: Wayne A. Scott, Rte. 1, Box 48, Saunemin, Ill. 61769

[21] Appl. No.: 536,296

[22] Filed: Jun. 11, 1990

Related U.S. Application Data

[60] Division of Ser. No. 455,037, Dec. 22, 1989, Pat. No. 5,072,499, which is a continuation of Ser. No. 272,489, Nov. 16, 1988, abandoned.

[51] Int. Cl.⁵ .......... B23P 19/04

[52] U.S. Cl. .......... 29/228; 29/227; 29/240.5; 81/7.5

[58] Field of Search .......... 29/225, 228, 226, 227, 29/240, 240.5; 81/7.5

[56] References Cited

U.S. PATENT DOCUMENTS 938,818 11/1909 Bowers .......... 81/7.5

1,529,386 3/1925 Anderson .......... 29/228

3,263,532 8/1966 Amberg .......... 81/7.5

4,807,347 2/1989 Johnson .......... 29/228

*Primary Examiner*—J. J. Hartman

*Attorney, Agent, or Firm*—Willian Brinks Olds Hofer Gilson & Lione

[57] ABSTRACT

The rewinder has a tubular housing defining an interior chamber which is open at the top and bottom ends and has an inboard annular shoulder and an aperture through the housing wall. A winder with a handle and an annular shoulder is received in the chamber with the handle extending out the bottom. The winder annular shoulder and the chamber form an annular rewinding compartment. The inboard end of the spring is held to the winder while the spring passes through the aperture in the chamber wall and the rewound spring is retained in the compartment by a cover. The rewinder also has an element that adjusts the effective diameter of the compartment.

4 Claims, 2 Drawing Sheets

STARTER SPRING REWINDER

This is a division of application Ser. No. 07/455,037, filed Dec. 22, 1989 now U.S. Pat. No. 5,072,499, which is a continuation of application Ser. No. 07/272,489, filed Nov. 16, 1988, now abandoned.

FIELD OF THE INVENTION

The present invention relates to a device for winding strip-type springs of concentric coils, and relates particularly to such a device for rewinding starter springs used in pull-cord starting mechanisms of internal combustion engines, such as chainsaws, lawn mowers and the like.

BACKGROUND OF THE INVENTION

In general, the rewinding or coiling of springs in lawn mowers, chainsaws and similar equipment is done by hand when the spring is being replaced after motor repair. Insertion of the spring onto the spring arbor or spring housing is typically done by hand. Basically, the individual that has done the repairs holds the inner end of the spring with his or her fingers, and then proceeds to wind the concentric spring coils of the ribbon-like spring upon each other as tightly as possible. The spring is prevented from unwinding simply by continually grasping it with the fingers.

Some care obviously has to be exercised while handling a spring in the foregoing fashion to prevent the spring from unwinding. The spring has a tendency to unwind longitudinally or to pop out of place vertically, sometimes with a fair amount of force. Hand-rewinding is hard on the finger muscles, and often can result in pinched fingers and no small amount . of frustration, since hand-rewinding calls for manual dexterity and patience. Hand-rewinding is still the most widely used technique for rewinding such starter springs, however, since there is a general lack of an ineffective and cheap instrument to perform the operation mechanically.

A number of hand-operated spring rewinding devices have been known, such as in the watch making art for rewinding of a watch mainspring. U.S. Pat. No. 1,812,494 is one such example. Such spring rewinding devices have a winding element which is received within a housing. The inner end of the spring to be rewound is attached to the winding element with the outer end of the spring being unrestrained and located exteriorly of the housing, along with the remainder of the spring. The winding element is rotated to pull the spring material into the housing for winding about the winding element in rewinding.

Once the spring is rewound, the winding element is removed from the housing, with the rewound spring either removed from the winding element for hand insertion into the motor housing, or charged by some means directly from the rewinder onto the spring arbor.

Some attempts have been made to adapt this watch spring rewinding technology to starter springs. Two such examples are U.S. Pat. Nos. 3,748,716 and 4,183,268. While interesting, such starter spring rewinders do not seem to have met with any significant commercial success, since hand-rewinding still remains the principal way to rewind these starter springs.

SUMMARY OF THE INVENTION

It is a principal objective of the present invention to provide an improved spring rewinder for compressively rewinding a ribbon-type spring of concentric s. In particular, the present invention is directed to a spring rewinding device for starter springs that is inexpensive to manufacture—to reduce its cost to the consumer—and is easily manipulated by the user. Embodiments of the invention also provide adjustability of the rewinder to accommodate varieties of spring coil heights and wound-coil diameters.

To this end, the present invention in such a spring rewinder comprises a tubular housing defining an interior chamber which is open at the top and bottom ends. An inboard annular shoulder is formed around the housing interior adjacent the housing top edge. The shoulder has a planar top surface which extends generally around the interior of the chamber.

A winder is rotatably received within the chamber. The winder has a handle which extends out of the housing bottom, and the handle is adapted to be grasped and rotated by the user. A winder stem extends from the handle beyond the chamber shoulder and toward the housing top. The winder preferably has an outboard extending annular shoulder formed around the winder which bears against the bottom of the inboard annular shoulder chamber. In use, the winder stem, shoulder top surface and the interior sidewall of the upper chamber combine to form a generally annular rewinding compartment.

A means is provided on the winder stem for receiving and holding the inboard end of the spring to be rewound. For example, this spring holding means can simply be a slot formed in the top of the winder stem within which the inboard end of the spring is slipped and thereby captured.

An aperture is formed through the housing side wall at about the level of the chamber shoulder top surface. It is through this housing aperture that the spring passes during rewinding.

A means is also provided for retaining the spring within the compartment during rewinding. This retaining means, in a preferred embodiment, is a cover which overlies the rewinding compartment. The cover is held in place, such as by forming a central hole in the cover within which is received the upper end of the winder stem, i.e., the cover is slipped on the stem. A retaining pin extends through a hole formed in the winder stem, with the pin overlying the cover to prevent outboard movement of the cover along the stem.

Modifications to the basic inventive rewinder include an embodiment that has a movable inboard shoulder which is slidable along the wall of the interior chamber. The slidable shoulder can be used to readily adapt the rewinder to accomodate springs of various widths, i.e., springs having different ribbon vertical heights. The rewinding compartment can be increased or decreased in vertical height by appropriate movement of the shoulder within the chamber. The slidable shoulder can also function as a discharge means for the rewound spring, using the winder to push the slidable shoulder outwardly.

A further modification contemplates the use of one or more set-screws extending through the tubular housing in the area of the rewinding compartment. The set-screws are used to adjust the effective outer diameter of-the rewinding compartment to enable rewinding of spring coils of various rewound diameters. For example, the set-screws are rotated into the compartment to adjust the compartment to a smaller outer diameter for the rewound spring.

The inventive rewinder is considered to represent an improvement over the prior art through, among other things, the ability to efficiently manufacture the device from a minimum number of pieces. The inventive rewinder further has a minimum number of pieces to be manipulated by the user, rendering it simple to operate, and can be manufactured cheaply to make it attractively priced for the consumer. While utilizing an efficient assembly, the rewinder nonetheless provides an enclosed compartment for the rewound spring which enhances the safe use of the rewinder. The rewinder can also be used in any orientation, and modifications enable adjustability to accommodate a variety of different spring sizes.

The invention will be further understood by reference to the following detailed description of an embodiment of the invention taken in conjunction with the drawings, in which:

DETAILED DESCRIPTION OF AN EMBODIMENT OF THE INVENTION

Figure 1:
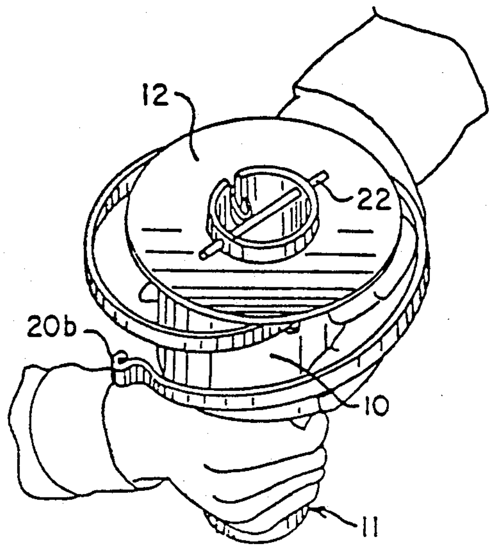
FIG. 1 is a perspective view of a rewinder made in accordance with the teachings of the present invention.

The spring rewinder discussed hereafter is a presently preferred form of the invention as adapted to the rewinding of ribbon-type spring coils having concentrically wound coils, such as are particularly used in the starter mechanisms of pull-start internal combustion engines used in chainsaws, lawn mowers and the like. It will be understood that the invention may have application in other environments besides that of spring rewinders of the foregoing type.

The illustrated spring rewinder has a cylindrical or tubular housing 10 within which is received a spring winder 11. A cap 12 is further provided in this preferred embodiment, which covers the top of the housing 10 and is received on the winder 11 in a manner to be described in further detail hereafter.

The housing 10 has a generally smooth circular interior chamber defined by an interior sidewall 10*a*. A shoulder or ledge 15 is formed extending inboard from the interior sidewall 10*a* around the chamber interior adjacent the top of the housing. The ledge 15 has a generally planar top surface 15*a*, and a like generally planar bottom surface 15*b*. Top surface 15*a* is spaced from the top edge of the housing 10. A large circular hole 15*c* is defined by the chamber ledge 15.

It is through this circular hole 15*c* that a stem portion 11*a* of the winder 11 extends. In this embodiment, the winder stem 11*a* is enlarged in diameter relative to a winder handle 11*b*, which extends from the bottom of the winder stem 11*a*. The handle 11*b* should have a diameter that is easily graspable for rotating the winder 11. The winder 11 is made hollow in this embodiment to reduce weight and materials.

Surrounding the winder stem 11*a* is an outboard extending annular shoulder 16. This shoulder 16 has a maximum diameter that is slightly less than the interior diameter of the chamber sidewall 10*a*, so that it thereby does not bind with the sidewall during rotation of the winder 11. A generally flat planar top surface 16*a* and a like generally planar bottom surface 16*b* are provided on the stem shoulder 16. The top surface 16*a* of the stem shoulder and the bottom surface 15*b* of the chamber ledge coact to position the winder 11 within the housing 10 for use.

Figure 3:
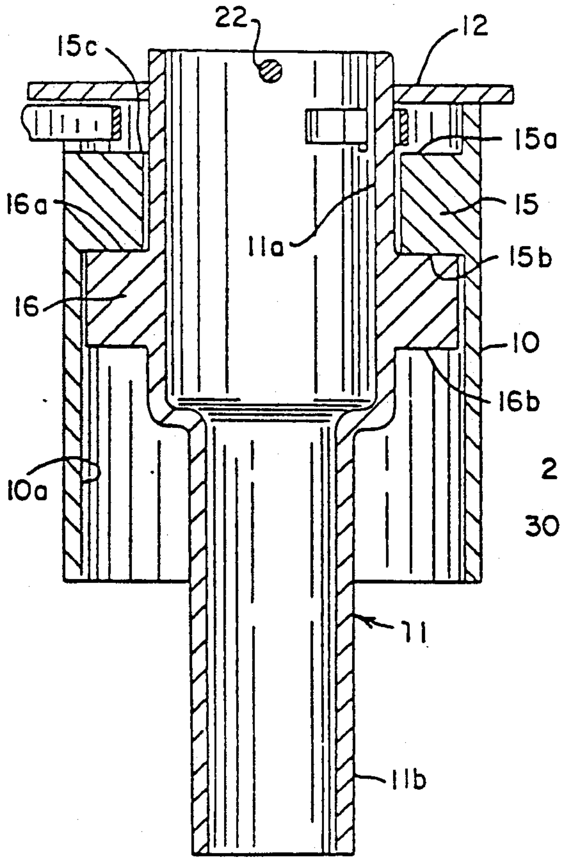
FIG. 3 is an enlarged sectional view taken along the axis of the rewinder (in assembled form) of FIG. 2.

As perhaps best shown in FIG. 3, the stem 11*a* of the winder 11 extends slightly beyond the top of the housing 10, with the handle 11*b* extending out of the bottom of the housing 10 a sufficient distance to be easily gripped by the user. PVC pipe material was used for manufacture of a prototype housing 10 and winder 11, with the shoulders 15 and 16 being cut to size and glued in position on the housing 10 and winder stem 11*a*, respectively.

Figure 2:
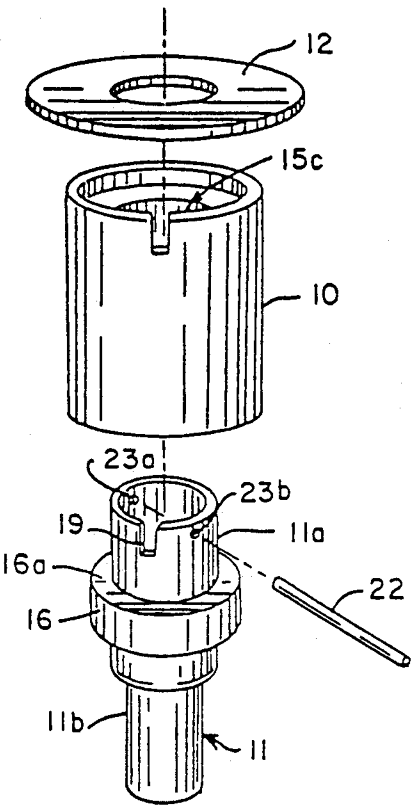
FIG. 2 is an exploded perspective view of the rewinder of FIG. 1.
Figure 4:
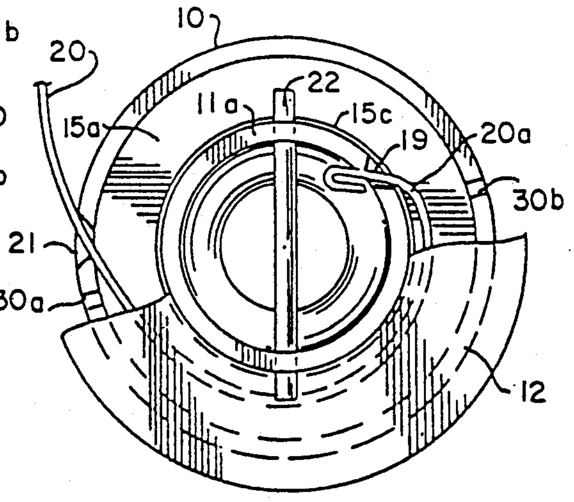
FIG. 4 is a top plan view, with parts broken away, of the rewinder shown in FIG. 3.

A slot 19 is cut in the winder stem 11*a* from the top edge of the stem to about the level of the top of ledge shoulder 15*a* (when the winder 11 is fully inserted within the housing 10). With reference to FIGS. 2 and 4 in particular, the slot 19 is sized sufficiently wide to permit ready insertion of a spring end 20*a* of a ribbon-type spring 20. Such spring ends 20*a* typically terminate in a reverse spring bend which widens the end, and also renders this end fairly inflexible. The spring end 20*a* is inserted in the slot 19 by placing the reverse bend inboard of the slot 19 with the spring 20 extending outboard through the slot 19. The spring 20 extends partway around the top surface of the ledge 15*a* and then out through a second slot or aperture 21 formed in the housing 10. Like the slot 19, the slot 21 extends from the top edge of the housing to about the level of the ledge top surface 15*a*.

Slots 19 and 21 should be just wide enough for the spring to coil freely, but not wide enough for the end of the spring to slide through slot 21, or pull out of slot 19 when rewinding. Slots 19 and 21 can be tapered, as illustrated.

With the spring 20 fixed in place for rewinding in the foregoing manner, cap 12 is placed onto the portion of the stem 11*a* that extends through the top of the housing. In this embodiment, the cap 12 is kept in place through use of a pin 22 that is received within and extends through a pair of radially aligned holes 23*a*, 23*b*. The holes 23*a*, 23*b* are formed in opposite sides of the top of the stem 11*a* so that the pin 22 will overlie the cover 12, with the cover 12 generally flush against the top edge of the housing 10. As can be readily seen, a closed rewinding chamber is thus formed between the cap 12, the ledge top surface 15*a* and the sidewalls of the housing 10 and stem 11*a* between the cap and top ledge surface 15*a*. It is within this closed compartment that the spring is rewound. The cap 12 serves as the means for retaining the spring 20 in place within the compartment.

In operation, the assembled unit with spring attached in the foregoing manner is grasped as shown in FIG. 1: one hand holds the housing 10, while the other hand grasps the handle 11*b*. The handle 11*b* is then rotated in a counter-clockwise fashion, drawing the spring 20 through the housing aperture 21 and thereby rewinding the spring 20 around the outside of the stem 11*a*. Rewinding is complete when the outboard end 20*b* of the spring 20 reaches the aperture 21. The pin 22 is thereupon removed and the cover 12 taken off the stem 11*a*.

The rewound spring can be removed from the winding compartment by grasping it with the fingers and placing it on the arbor of its starting mechanism. To facilitate removal, the tubular housing 10 can be modified (FIG. 4) to provide a pair of slots 30*a*, 30*b* in the sidewall in the area of the rewinding compartment. These slots 30*a*, 30*b* extend from about the top of the shoulder 15 to the top of the housing. Prior to rewinding, a wire (not shown) can be inserted to extend through the slots 30*a*, 30*b*. After the spring 20 is rewound, the wire is used to tie the adjacent spring coils together. The tied spring coils are then readily removed.

Figure 5:
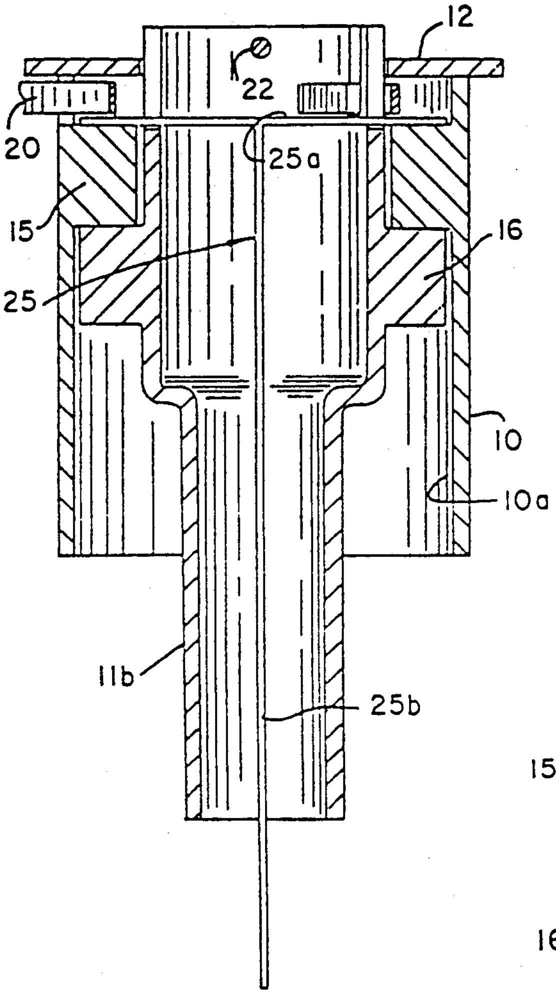
FIG. 5 is a view similar to that of FIG. 3 showing a discharge pusher.
Figure 6:
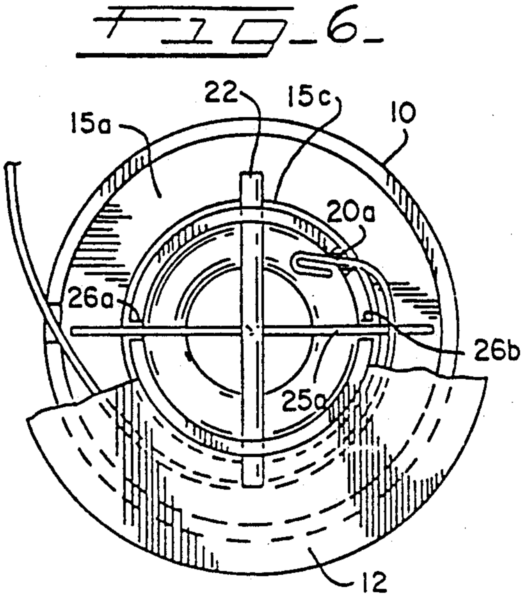
FIG. 6 is a top plan view, with parts broken away, of the rewinder shown in FIG. 5.
Figure 7:
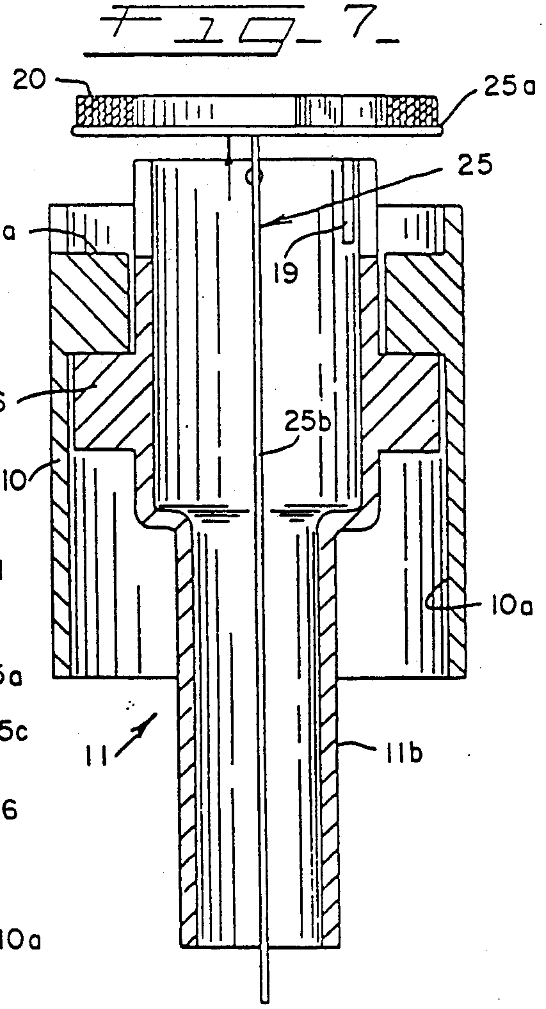
FIG. 7 shows the operation of the discharge pusher of FIGS. 5 and 6.

Alternatively, and as shown in FIGS. 5-7, a T-shaped charging mechanism 25 could be provided, with the T-top carried in a pair of slots 26*a*, 26*b* formed in the stem 11*b* in the manner of slot 19. The T-top 25*a* rests on the ledge 15*a*. The trunk 25*b* of the T extends down through the handle 11*b* and out the bottom of the handle. The rewound spring is charged from the compartment using the T to push it out.

Figure 8:
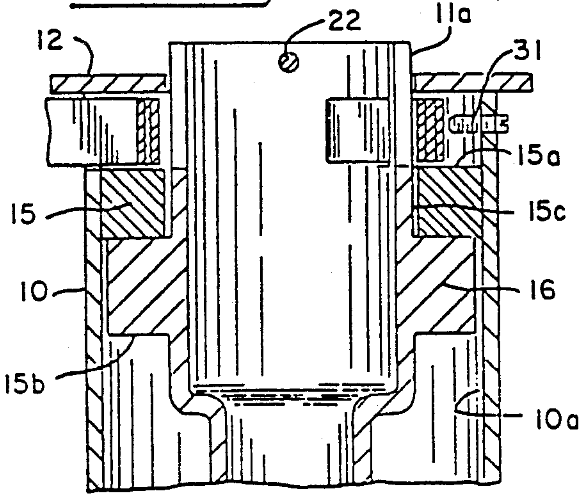
FIG. 8 shows modifications to the rewinder for adjustability of the rewinding compartment.

Modifications to the rewinder to accomodate spring coils of different widths (i.e., vertical heights) and rewound diameters are shown in FIG. 8. One such modification provides a movable ledge 15′ within the tubular housing 10. The ledge 15′ is slidable along the sidewall 10*a* via a loose friction fit. The ledge 15′ can therefore be moved closer to the top edge of the housing or farther away to vary the vertical height of the rewinding compartment. Springs of different widths can therefore be accomodated within the rewinding compartment.

The movable ledge 15 can also be utilized as a discharge mechanism for the rewound spring coil. As is readily apparent, the winder can be forcibly pushed upwardly to move the ledge 15′ outwardly, thereby charging the rewound spring from the rewinding compartment.

Another modification shown in FIG. 8 is the use of one or more set-screws 31 around the rewinding compartment. The set-screws 31 extend through the housing 10 and into the rewinding compartment. The set-screws 31 are rotated into or out of the compartment to thereby adjust the effective outer diameter of the compartment. Thus, if a spring coil is to be rewound with a final coil diameter less than the inner sidewall diameter of the housing 10, the set-screws 31 are rotated inwardly to reduce the compartment diameter to the desired coil diameter.

Thus, while the invention has been described in relation to a particular embodiment, those with skill in this art will recognize modifications, substitution of materials, and the like which will still fall within the scope of the invention.

What is claimed is:

1. A spring rewinder for compressibly rewinding a ribbon-type spring of concentric coils, comprising:

a housing having an interior chamber defined by at least one interior sidewall, said chamber extending through said housing and open at a top and a bottom end;

a ledge formed within said chamber having a generally planar top surface extending around said chamber interior sidewall in a plane generally perpendicular to a longitudinal axis of said chamber, and a bottom surface;

a winder rotatably received within said interior chamber having a handle extending out of said chamber bottom end which is adapted to be grasped and rotated, and a stem extending through and beyond said ledge toward said housing top;

said winder stem, ledge top surface and interior sidewall combining to form a generally annular rewinding compartment;

means formed on said winder stem for receiving and holding an inboard spring end;

an aperture formed through said housing sidewall at about the level of said ledge top surface through which the spring passes in rewinding; and means for adjusting the effective diameter of said rewinding compartment wherein said means extends into said compartment from said housing sidewall.

2. The rewinder of claim 1 wherein said means for adjusting the effective diameter of said rewinding compartment comprises at least one set-screw extending through said housing sidewall and into said compartment, said set-screw being rotated into said compartment to reduce the effective diameter of said compartment.

3. A spring rewinder for compressibly rewinding a ribbon-type spring of concentric coils, comprising:

a housing having an interior chamber defined by at least one interior sidewall, said chamber extending through said housing and open at a top and a bottom end;

a ledge formed within said chamber having a generally planar top surface extending around said chamber interior sidewall in a plane generally perpendicular to a longitudinal axis of said chamber, and a bottom surface;

a winder rotatably received within said interior chamber having a handle extending out of said chamber bottom end which is adapted to be grasped and rotated, and a stem extending through and beyond said ledge toward said housing top;

said winder stem, ledge top surface and interior sidewall combining to form a generally annular rewinding compartment;

means formed on said winder stem for receiving and holding an inboard spring end;

an aperture formed through said housing sidewall at about the level of said ledge top surface through which the spring passes in rewinding; and means for adjusting the effective diameter of said rewinding compartment wherein said means remains at a fixed location while the rewinder is in use.

4. A spring rewinder for compressibly rewinding a ribbon-type spring of concentric coils, comprising:

a tubular housing which is open at top and bottom ends having an interior chamber defined by at least one interior sidewall;

a movable inboard annular shoulder provided around said housing chamber adjacent said housing top end, said inboard shoulder having a generally planar top surface extending in a plane generally perpendicular to a longitudinal chamber axis, and a generally planar bottom bearing surface parallel to said top surface;

a winder rotatably received within said housing chamber having a hand-graspable handle extending out of said housing bottom end, an outboard annular shoulder formed around said winder, said outboard shoulder bearing against said inboard shoulder bottom bearing surface, and a winding stem portion defined on said winder extending through and beyond said inboard shoulder top surface and out of said housing top;

said winder stem, inboard shoulder top surface and housing interior sidewall combining to form a generally annular rewinding compartment;

a slot formed in said winding stem through which a spring end extends, said slot extending from a winder top end to about the level of said inboard annular shoulder top when said rewinder is assembled, and being sized in width smaller than an enlarged nub formed on a spring inboard end;

a slot formed through said housing sidewall extending from said top end to about the level of said inboard annular shoulder top surface through which the spring passes in rewinding;

at least one set-screw extending through said housing sidewall and into said compartment, said set-screw being rotated into said compartment to reduce the effective diameter of said compartment; and a cover overlying said compartment, the cover having a circular opening through which said winding stem portion extends with said cover mounted in place on said winding stem portion, with a pin extending through at least one hole formed in said stem to overly said cover and prevent upward movement of said cover along said winding stem portion.

* * * * *